United States Patent
Arai et al.

(10) Patent No.: US 9,793,038 B2
(45) Date of Patent: Oct. 17, 2017

(54) ELECTROMAGNETIC DRIVE COIL UNIT AND MOLDING METHOD THEREOF

(71) Applicant: FUJIKOKI CORPORATION, Tokyo (JP)

(72) Inventors: Yusuke Arai, Tokyo (JP); Takeshi Hosoya, Tokyo (JP)

(73) Assignee: FUJIKOKI CORPORATION (JP)

( * ) Notice: Subject to any disclaimer, the term of this patent is extended or adjusted under 35 U.S.C. 154(b) by 48 days.

(21) Appl. No.: 14/679,458

(22) Filed: Apr. 6, 2015

(65) Prior Publication Data

US 2015/0302963 A1    Oct. 22, 2015

(30) Foreign Application Priority Data

Apr. 16, 2014 (JP) ................................. 2014-084445

(51) Int. Cl.
*H01F 7/128* (2006.01)
*H02K 5/08* (2006.01)
(Continued)

(52) U.S. Cl.
CPC .............. *H01F 7/128* (2013.01); *H02K 5/08* (2013.01); *H02K 5/225* (2013.01); *H02K 15/12* (2013.01);
(Continued)

(58) Field of Classification Search
CPC ... H01F 7/128; H01F 2007/062; H02K 15/12; H02K 5/08; H02K 5/225; H02K 37/14; H02K 3/525
See application file for complete search history.

(56) References Cited

U.S. PATENT DOCUMENTS 5,648,692 A * 7/1997 Watanabe ................ H02K 1/02
                                                          310/43
5,770,900 A * 6/1998 Sato ...................... H02K 3/525
                                                         310/194
(Continued)

FOREIGN PATENT DOCUMENTS

DE      102012214624 A1      2/2014
JP         GB 2245107 A  *  12/1991  ........... H02K 15/022
(Continued)

OTHER PUBLICATIONS

European Office Action for application No. 15162920.1 dated Jun. 10, 2016.

*Primary Examiner* — Mohamad Musleh
(74) *Attorney, Agent, or Firm* — Bacon & Thomas, PLLC

(57) ABSTRACT

A method of molding an electromagnetic drive coil unit is provided which can secure satisfactory strength and waterproof properties. In a method of molding an electromagnetic drive coil unit in which a stator assembly includes bobbins having stator coils wound thereon and yokes in which an inner yoke having magnetic pole teeth and an outer yoke having magnetic pole teeth are combined and in which the stator assembly and a power supply terminal supplying power to the bobbins are molded in a resin, an inner molding process is performed on the inside of the outer yoke in a state where ends of the stator coils of the stator assembly are connected to the power supply terminal and an outer molding process is performed to cover an outer circumference of the stator assembly having an inner molded portion and an outside of the power supply terminal after the inner molding process.

9 Claims, 9 Drawing Sheets

(51) Int. Cl.
  *H02K 5/22* (2006.01)
  *H02K 15/12* (2006.01)
  *H01F 7/06* (2006.01)
  *H02K 37/14* (2006.01)
  *H02K 3/52* (2006.01)

(52) U.S. Cl.
  CPC ........ *H01F 2007/062* (2013.01); *H02K 3/525* (2013.01); *H02K 37/14* (2013.01)

(56) References Cited

U.S. PATENT DOCUMENTS

| | | | | |
|---|---|---|---|---|
| 5,829,119 A | * | 11/1998 | Matsushita | H02K 1/145 29/596 |
| 6,479,911 B1 | * | 11/2002 | Koike | H02K 1/145 310/257 |
| 6,509,661 B1 | * | 1/2003 | Kujira | H02K 5/225 310/71 |
| 2004/0041494 A1 | * | 3/2004 | Suzuki | H02K 3/525 310/400 |
| 2004/0041495 A1 | * | 3/2004 | Suzuki | H02K 3/525 310/49.13 |
| 2006/0103243 A1 | * | 5/2006 | Ogawa | H02K 1/145 310/49.36 |
| 2009/0140584 A1 | * | 6/2009 | Ohkawa | H02K 5/1672 310/43 |
| 2009/0200502 A1 | * | 8/2009 | Hoppe | F01L 1/34 251/129.15 |
| 2009/0278640 A1 | | 11/2009 | Oh et al. | |
| 2009/0284100 A1 | * | 11/2009 | Huang | H02K 1/145 310/257 |
| 2014/0070647 A1 | * | 3/2014 | Kawamata | H02K 5/225 310/71 |

FOREIGN PATENT DOCUMENTS

JP   H0865994 A    3/1996
JP   2010106796 A  5/2010

* cited by examiner

ELECTROMAGNETIC DRIVE COIL UNIT AND MOLDING METHOD THEREOF

BACKGROUND OF THE INVENTION

1. Field of the Invention

The present invention relates to an electromagnetic drive coil unit which is provided as an actuator in an electric valve or an electromagnetic valve and a molding method thereof.

2. Description of the Related Art

As an example of a resin-sealing structure of such a type of electromagnetic drive coil unit, Japanese Patent Application Laid-open No. 2010-106796 discloses a stepping motor which includes a stator including a coil, a magnet rotor installed in the stator, and an output shaft fixed to the center of the magnet rotor and in which the coil or the magnet rotor is molded and covered with a resin casing and a connector protruding from the casing is formed integrally in the casing.

Japanese Patent Application Laid-open No. 8-65994 discloses an example in which a stator coil of a stepping motor which is provided as a molded coil includes first and second outer yokes having plural magnetic pole teeth formed to protrude from an inner circumference thereof, first and second coil-winding bobbins being positioned and fitted into the outer yokes, first and second intermediate yokes having the same number of magnetic pole teeth as the magnetic pole teeth of the first outer yoke and the second outer yoke formed to protrude from inner circumferences thereof and being positioned and fitted into openings of the first and second outer yokes, gap holding means for securing an inflow gap of a molding resin between a first inner yoke and a second inner yoke, and an outer shell molded in a resin to mold the gap, gaps between the magnetic pole teeth, and a bobbin winding space portion and to cover the outsides of the outer yokes and in which a connector as a tubular socket portion is integrally formed to protrude from an outer circumferential portion of the outer shell.

SUMMARY OF THE INVENTION

In Japanese Patent Application Laid-open Nos. 2010-106796 and 8-65994, for example, when the shape or the like of an opposite connector connected to the connector is changed, it is necessary to change a molding die to correspond to the shape or the like and to perform the molding. Since a fitting dimension of the connector to the opposite connector is strictly required, it is necessary to strictly manage the dimensional accuracy of the molding die, thereby causing an increase in cost.

The invention is made in consideration of the above-mentioned circumstances and an object thereof is to provide an electromagnetic drive coil unit that can satisfactorily mold a stator assembly with a complicated structure and a connector portion requiring accuracy and that can secure sufficient strength and waterproof properties and a molding method thereof.

According to an aspect of the invention, there is provided an electromagnetic drive coil unit in which a stator assembly including a cylindrical yoke having magnetic pole teeth formed therein and a stator coil is molded in a resin, wherein the stator assembly and a connector portion for a power supply terminal to the stator coil which are molded through separate processes are formed as a unified body.

In the electromagnetic drive coil unit according to the aspect of the invention, the connector portion for the power supply terminal to the stator coil may be molded in advance, the connector portion may be inserted into the stator assembly, and the resultant may be molded as a unified body.

In the electromagnetic drive coil unit according to the aspect of the invention, the stator assembly which is molded in advance may be used as an inner molded body and the connector portion may be formed as a unified body with the inner molded body through an outer molding process.

According to another aspect of the invention, there is provided a method of molding an electromagnetic drive coil unit in which a stator assembly including a cylindrical yoke having magnetic pole teeth formed therein and a stator coil is molded in a resin, wherein the stator assembly and a connector portion for a power supply terminal to the stator coil are molded through separate processes to form a unified body.

In the method of molding the electromagnetic drive coil unit according to the aspect of the invention, the connector portion for the power supply terminal to the stator coil may be molded in advance, the connector portion may be inserted into the stator assembly, and then the resultant may be molded as a unified body.

The method of molding the electromagnetic drive coil unit according to the aspect of the invention includes: a first process of forming the stator assembly through an inner molding process; and a second process of forming the connector portion to form a unified body through an outer molding process.

According to still another aspect of the invention, there is provided a method of molding an electromagnetic drive coil unit in which a stator assembly including a bobbin having a stator coil wound thereon and a yoke having magnetic pole teeth and a power supply terminal supplying power to the bobbin are molded in a resin, the method including: performing an inner molding process in a state in which an end of the stator coil of the stator assembly is connected to the power supply terminal; and performing an outer molding process to cover an outer circumference of the stator assembly formed through the inner molding process and an outside of the power supply terminal after performing the inner molding process.

In the method of molding the electromagnetic drive coil unit according to the aspect of the invention, a dwelling process may be performed at a low pressure when performing the inner molding process, and a dwelling process may be performed at a pressure higher than the low pressure when performing the outer molding process.

In the method of molding the electromagnetic drive coil unit according to aspect of the invention, a resin material used to perform the inner molding process and a resin material used to perform the outer molding process may be the same type of resin material.

In the method of molding the electromagnetic drive coil unit according to the aspect of the invention, an introduction hole may be formed in a side wall of the yoke and a resin material which is used to perform the inner molding process may be introduced into the yoke through the introduction hole.

In the method of molding the electromagnetic drive coil unit according to the aspect of the invention, the yoke may include an upper yoke and a lower yoke which are disposed to face each other, the upper yoke and the lower yoke each may include an inner yoke and an outer yoke, and the inner molding process may be performed in a state in which the outer yoke is not attached to the stator assembly.

In the method of molding the electromagnetic drive coil unit according to the aspect of the invention, a plurality of the introduction holes may be formed in the side wall of the yoke and the resin material may be introduced into the yoke through the plurality of introduction holes formed in the side wall of the yoke, and the resin material introduced to perform the outer molding process may be introduced from a single resin injection hole.

Since the electromagnetic drive coil unit according to the invention is the electromagnetic drive coil unit in which a stator assembly including a cylindrical yoke having magnetic pole teeth formed therein and a stator coil is molded in a resin, wherein the stator assembly and a connector portion for a power supply terminal to the stator coil which are molded through separate processes are formed as a unified body, it is possible to satisfactorily mold the stator assembly with a complicated structure and the connector portion requiring accuracy.

That is, in the electromagnetic drive coil unit according to the invention, since the stator assembly and the connector portion are formed as separate members, the stator assembly having a complicated structure and the connector portion requiring accurate molding can be formed using separate molds.

By preparing plural types of connector frame members to correspond to opposite connectors, it is possible to manufacture various molded coil units without changing a molding die.

In the method of molding the electromagnetic drive coil unit according to the invention, since the stator assembly of the electromagnetic drive coil unit is formed through the inner molding process and the outer circumference thereof and the like are formed through the outer molding in a dwelling process at a high pressure, it is possible to form the stator assembly having a complicated structure and the connector frame member requiring accurate molding using separated molds.

It is possible to prevent a liquid such as water from invading into the electromagnetic drive coil unit using the molded portion and to prevent bubbles from being generated in the molded portion. Accordingly, it is possible to provide an electromagnetic drive coil unit with waterproof properties and strength secured.

Since the inner molding process is performed using a dwelling process at a low pressure, it is possible to prevent breaking of the stator coil which is installed in the stator assembly and which can be relatively easily broken with an external pressure. On the other hand, since the inner molded portion formed through the inner molding process is formed in the dwelling process at a low pressure in consideration of the breaking of the stator coil or the like, it may be difficult to secure satisfactory strength due to formation of a void or the like. However, since the molded portions of the outer circumference of the stator assembly having the inner molded portion and the outer circumference of the power supply terminal molded in a resin material supplied to perform the inner molding process are covered with an outer molded portion, a double-molded structure is provided in which the inner molded portion is covered with the outer molded portion and it is thus possible to satisfactorily enhance the strength of the portion molded through the dwelling process at a low pressure.

DETAILED DESCRIPTION OF THE PREFERRED EMBODIMENTS

First Embodiment

Figure 1:
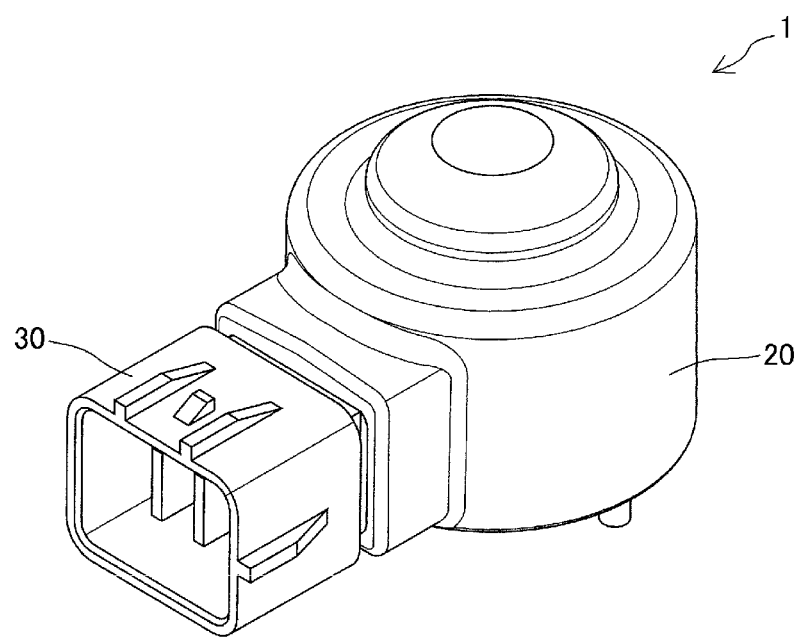
FIG. 1 is a perspective view illustrating an electromagnetic drive coil unit according to a first embodiment of the invention.

In an electromagnetic drive coil unit 1 according to a first embodiment of the invention, as illustrated in FIG. 1, a resin mold 20 is formed after power supply terminals 122 and 142 (FIG. 2) are inserted into a connector frame member 30 which has been molded in advance. Accordingly, a stator assembly having a complicated structure and the connector frame member requiring accurate molding can be formed using separate molds.

Figure 2:
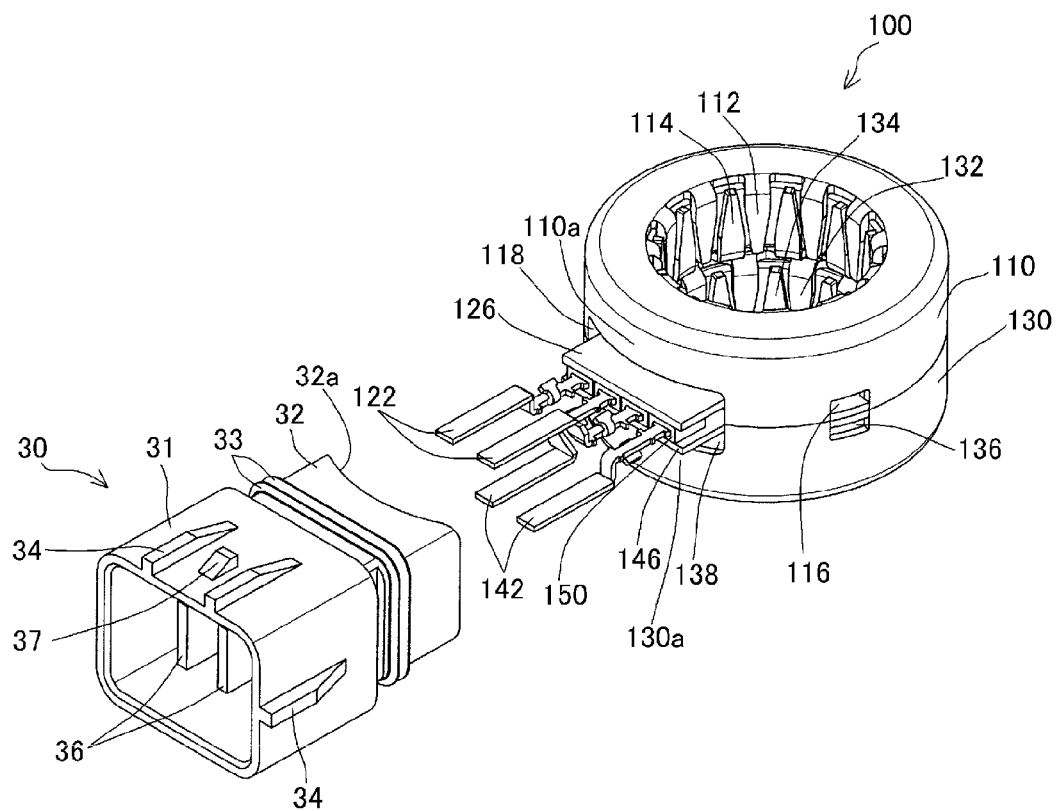
FIG. 2 is a perspective view illustrating a component structure of the electromagnetic drive coil unit according to the first embodiment of the invention.

More specifically, as in the component structure illustrated in FIG. 2, the connector frame member 30 is prepared as a separate member, which has been molded in a separate process in advance, with respect to a stator assembly 100.

The connector frame member 30 which has been molded through a separate process in advance is a resin member and includes a connector portion 31 and a coupling portion 32. The coupling portion 32 has an edge portion 32a which comes in close contact with the outer circumferences of an upper yoke 110 and a lower yoke 130 of the stator assembly 100 to be described later. The outer circumference of the coupling portion 32 is provided with ribs 33 for improving bondability to a molding resin in a subsequent process.

The connector portion 31 is provided with an outer guide portion 34, an inner guide portion 36, and a stopper protrusion 37 which are used for locking to an opposite connector (not illustrated). The connector portion 31 requires high accuracy with respect to the opposite connector.

The stator assembly 100 includes the upper yoke 110 and the lower yoke 130 which have a cylindrical shape and which are arranged to face each other.

The upper yoke 110 includes magnetic pole teeth 112 and 114 disposed on the inner circumference thereof and generates a magnetic field through a stator coil (not illustrated) disposed in the upper yoke 110.

The lower yoke 130 also has the same structure as the upper yoke 110 and includes magnetic pole teeth 132 and 134, which generates a magnetic field through a stator coil, on an inner circumference thereof.

On the outer circumferences of the upper yoke 110 and the lower yoke 130, introduction holes 116 and 136 for introducing a resin therein are formed at several positions to face each other, and the inside and the outside of the upper yoke 110 and the lower yoke 130 have a complicated configuration. In this embodiment, the introduction holes are formed at four positions of the outer circumferences, though not particularly illustrated.

Horizontally-long notched openings 118 and 138 are formed in the outer circumferences of the upper yoke 110 and the lower yoke 130, the notched openings 118 and 138 are vertically matched to form an opening, and bobbin end portions 126 and 146 extend from the inside of the stator assembly 100.

The bobbin end portions 126 and 146 support power supply terminals 122 and 142 from the upper and lower stator coils with a terminal support member 150 interposed therebetween.

The edge portion 32a of the coupling portion 32 of the connector frame member 30 has the same arc shape as cylindrical outer surfaces 110a and 130a around the opening of the notched openings 118 and 138, and has a configuration in which the arc-shaped edge portion 32a comes in contact with the cylindrical outer surfaces 110a and 130a around the opening of the notched openings 118 and 138.

Figure 3:
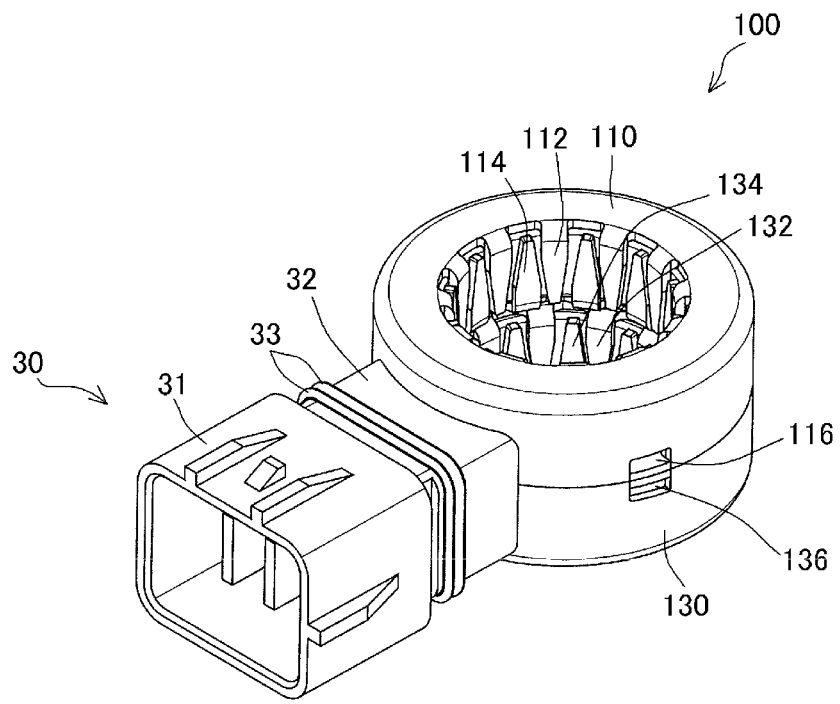
FIG. 3 is a perspective view illustrating a state of the electromagnetic drive coil unit according to the first embodiment of the invention before injection molding.

When the whole electromagnetic drive coil unit is molded in a resin, as illustrated in FIG. 3, the entire structure is molded in a subsequent process after the previously-molded connector frame member 30 is connected to the stator assembly 100 having a complicated structure.

Figure 4:
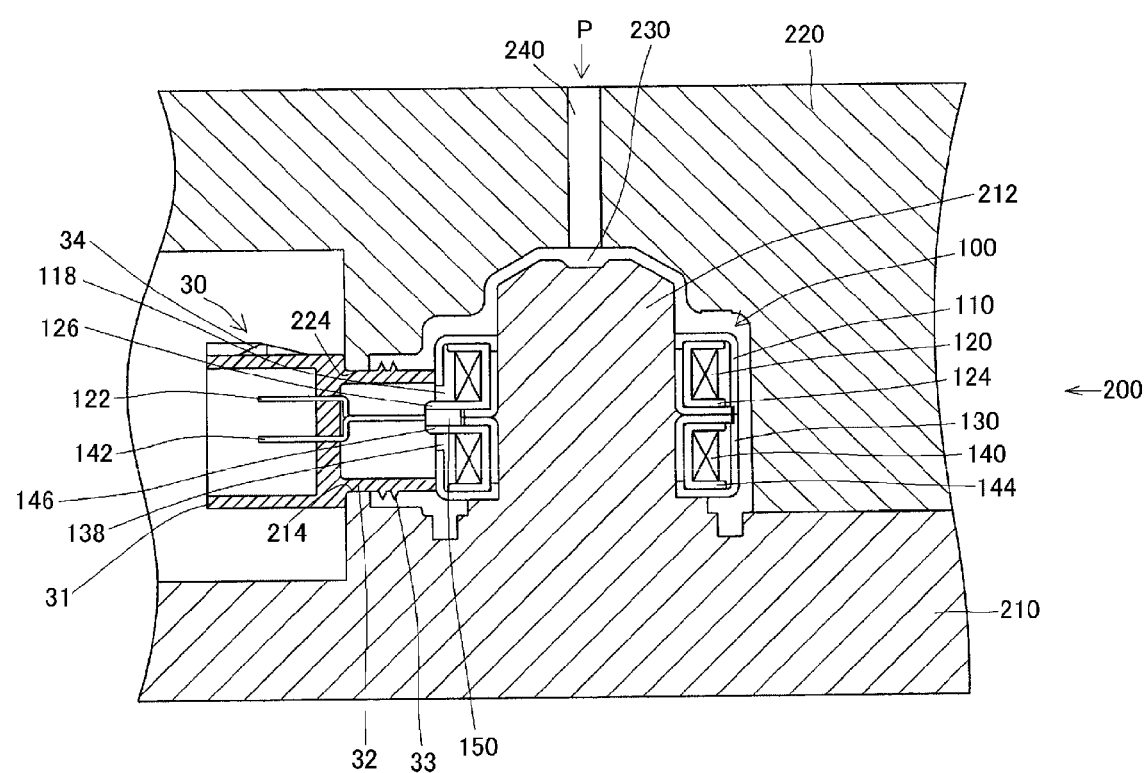
FIG. 4 is a cross-sectional view illustrating a state in which the electromagnetic drive coil unit according to the first embodiment of the invention is mounted on an injection molding die.

Injection molding and a molding method will be described below. The previously-molded connector frame member 30 illustrated in FIG. 3 is inserted into the stator assembly 100 having a complicated structure to form a connected body, and the resultant is disposed in a die 200 of an injection molding machine (not illustrated) as illustrated in FIG. 4. In the drawing, a stator coil 120 and a bobbin 124 to be disposed in the upper yoke 110, a stator coil 140 and a bobbin 144 to be disposed in the lower yoke 130, and the connector frame member 30 are illustrated in a cross-sectional view.

The die 200 of the injection molding machine includes a lower die 210 and an upper die 220 and the upper die 220 has a resin injection hole 240.

The lower die 210 includes a core 212 into which the inner circumference of the stator assembly 100 is inserted. The lower die 210 and the upper die 220 form a cavity 230 for forming a resin layer on the outer circumferences of the connector frame member 30 and the stator assembly 100.

In a state in which the connector frame member 30 is interposed between a gate portion 214 of the lower die 210 and a gate portion 224 of the upper die 220, a molding resin P is injected from the resin injection hole 240 and the resin is injected into the cavity 230, whereby the electromagnetic drive coil unit 1 is molded in which the resin layer is formed on the outer circumference of the stator assembly 100 illustrated in FIG. 1 and the resin layer is bonded to the connector frame member 30.

The injected molding resin P is introduced from introduction holes 116 and 136 formed in the outer circumferences of the upper yoke 110 and the lower yoke 130, and the stator coil 120 and the bobbin 124 disposed in the upper yoke 110 having a complicated structure and the stator coil 140 and the bobbin 144 disposed in the lower yoke 130 are sealed with the molding resin P.

Figure 5:
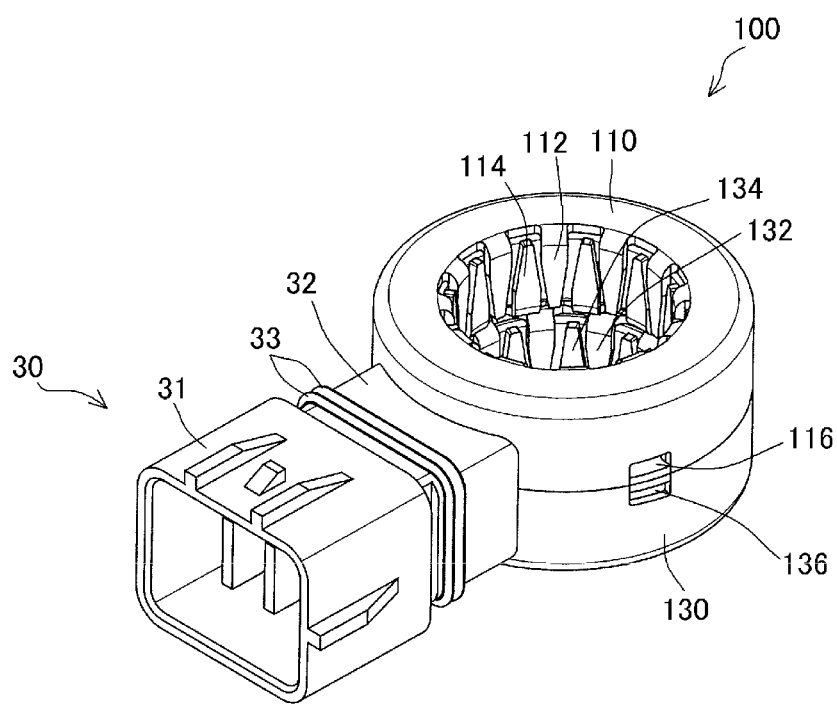
FIG. 5 is a perspective view illustrating another example of the electromagnetic drive coil unit according to the first embodiment of the invention.

In another example of the electromagnetic drive coil unit according to the first embodiment of the invention, as illustrated in FIG. 5, a connector frame member 30a different from the connector frame member 30 illustrated in FIGS. 1 to 3 and a resin mold 20 are bonded and molded.

The connector frame member 30a is different from the above-mentioned connector frame member 30 in that the outline thereof has a small size, but similarly includes a guide portion 34a and a stopper protrusion 37a and is locked to an opposite connector.

The connector frame member 30a instead of the previously-molded connector frame member 30 illustrated in FIG. 3 is connected to the stator assembly 100, the resultant is disposed in the die 200 of the injection molding machine illustrated in FIG. 4, and a molding resin P is injected from the resin injection hole 240, whereby an electromagnetic drive coil unit 1a having a different type of connector frame member 30a from the electromagnetic drive coil unit 1 is molded.

As described in the electromagnetic drive coil units according to the first embodiment and another example of the first embodiment, by molding and preparing various types of connector frame members to correspond to the types of the opposite connectors in advance, the outer circumference of the stator assembly can be molded in a resin in a state in which an appropriate connector frame member is connected to the stator assembly. In this case, the dimensions of the connector frame members 30 and 30a which are interposed between the gate portion 214 of the lower die 210 and the gate portion 224 of the upper die 220 need to be set to the same dimension. Accordingly, even when the connector frame member is changed, it is possible to manufacture an electromagnetic drive coil unit without changing the injection molding die. Here, the stator assembly having a complicated structure and the connector frame member requiring accurate molding can be formed using separate molds.

In this way, in the first embodiment of the invention, by preparing connector frame members depending on the types of the opposite connectors connected to the resin mold 20 through a molding process in advance, it is possible to efficiently manufacture various electromagnetic drive coil units by combining the connector frame members with the stator assembly 100 having a complicated structure.

The resin used to cover the stator coils and the resin as a material of the connector frame member may be different from each other, because the stator coils and the connector frame member are formed through different molding processes, but are preferably the same in consideration of unity of a product as a whole or bondability between the resins. In this case, it is preferable that molding conditions such as a molding pressure of the connector frame member and the stator assembly be changed. When the molding pressure is changed, it is preferable that the molding pressure of the connector frame member be set to be higher.

Second Embodiment

An electromagnetic drive coil unit 1b (FIG. 8) according to a second embodiment of the invention includes a stator assembly 300 and a connector portion 304 surrounding a power supply terminal 303, and an outer guide portion 305 and a stopper protrusion 306 for locking a plug are formed on the outer circumferential surface of the connector portion 304 which the plug (not illustrated) is attached to and detached from.

Figure 6:
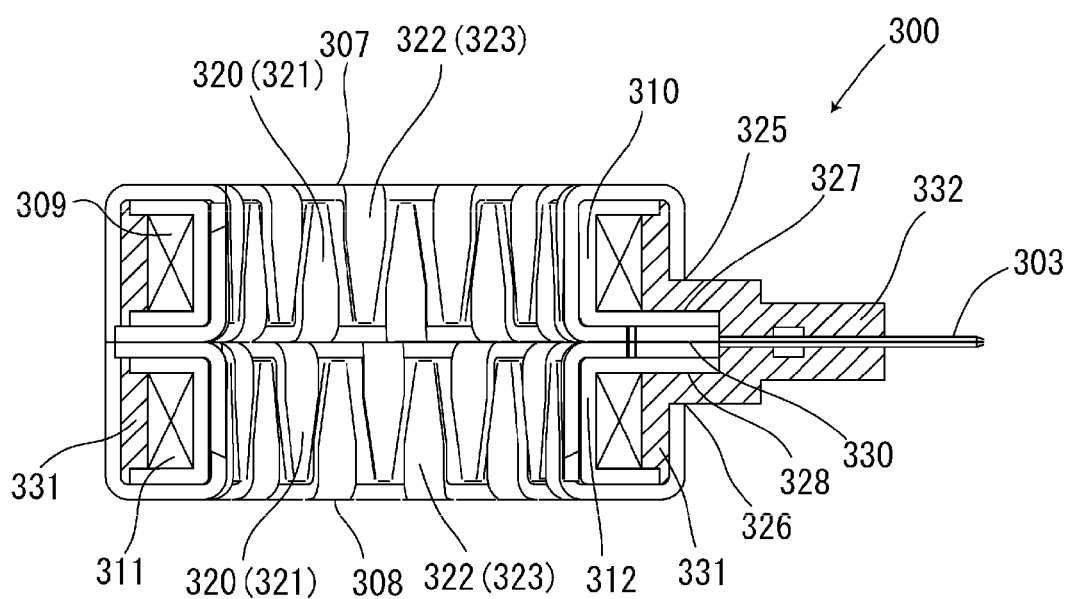
FIG. 6 is a cross-sectional view illustrating a configuration of an inner molded portion of an electromagnetic drive coil unit according to a second embodiment of the invention.
Figure 7:
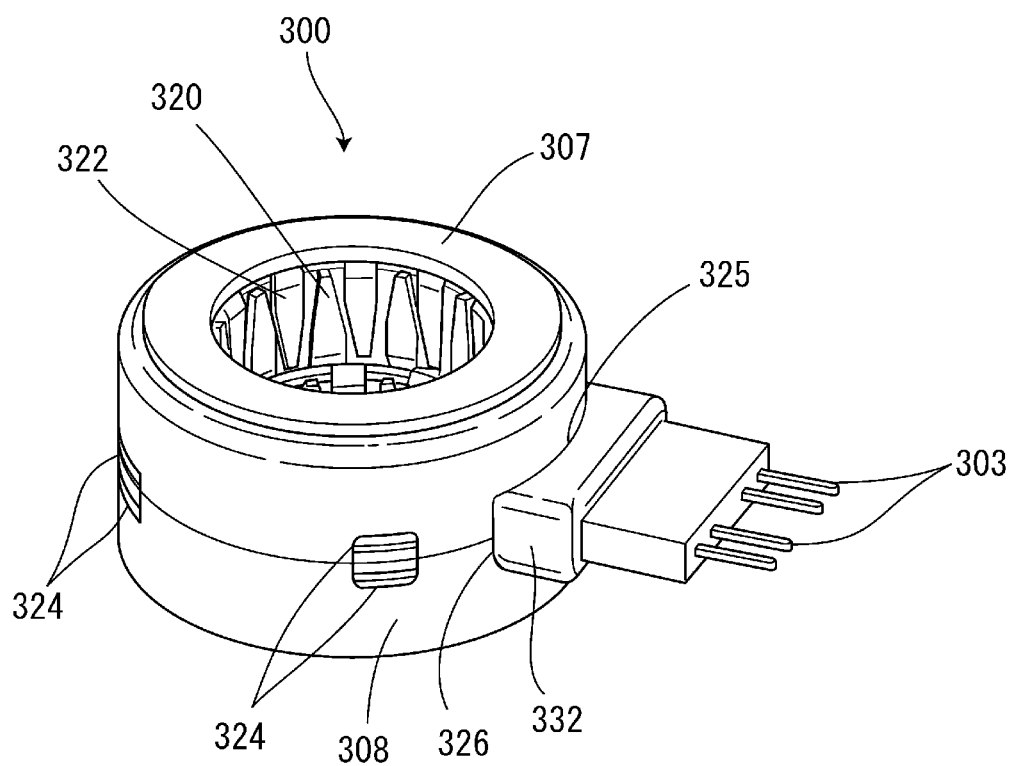
FIG. 7 is a perspective view illustrating the configuration of the inner molded portion of the electromagnetic drive coil unit according to the second embodiment of the invention.

As illustrated in FIG. 7, the stator assembly 300 is provided with an upper yoke 307 and a lower yoke 308 which have a cylindrical shape and which are arranged to face each other, and includes an upper bobbin 310 on which a stator coil 309 is wound (FIG. 6) and a lower bobbin 312 on which a stator coil 311 is wound so as to correspond to the upper yoke 307 and the lower yoke 308. The upper yoke 307 and the lower yoke 308 have the same shape, the upper bobbin 310 and the lower bobbin 312 have the same shape, and inner yokes 321 (to be described later) disposed therein are arranged to face each other. Accordingly, description of the lower yoke 308 and the lower bobbin 312 will not be repeated and the upper yoke 307 and the upper bobbin 310 will be described below.

The upper yoke 307 has a configuration in which an inner yoke 321 having magnetic pole teeth 320 and an outer yoke 323 having magnetic pole teeth 322 are combined, and generates a magnetic field by supplying power to the stator coil 309 wound on the upper bobbin 310.

Introduction holes 324 (FIG. 7) for introducing a resin injected from an injection molding machine therein are formed in the outer circumference of the upper yoke 307. Specifically, the introduction holes 324 are formed at four positions of the outer circumference of the outer yoke 323.

Horizontally-long notched openings 325 and 326 are formed in the outer circumferences of the upper yoke 307 and the lower yoke 308. In the notched openings 325 and 326, bobbin end portions 327 and 328 of the bobbins 310 and 312 are installed to extend outward from the inside of the stator assembly 300. The bobbing end portions 327 and 328 support a power supply terminal 303 with a terminal support member 330 interposed therebetween.

Before a molding process to be described later is performed, ends of the stator coils 309 and 311 located in the bobbing end portions 327 and 328 are connected to the power supply terminal 303.

Now, a method of molding the electromagnetic drive coil unit 1b through two processes of an inner molding process and an outer molding process using an injection molding machine and a resin material will be described.

In a state in which the power supply terminal 303 is connected to the ends of the stator coils 309 and 311 located in the bobbin end portions 327 and 328, the inner molding process is performed on the insides of the upper and lower yokes 307 and 308 using a dwelling process at a low temperature and a low pressure as a first molding process. Accordingly, by introducing the resin material P into the upper and lower yokes 307 and 308 through the introduction holes 324 formed in the side walls of the upper and lower yokes 307 and 308, inner molded portions 331 in the upper and lower yokes 307 and 308 are sealed. At the same time, inner molded portions 332 are formed to seal the outer circumference of the power supply terminal 303 with the resin material P supplied in the inner molding process as illustrated in FIG. 6. The inner molded portions 332 are formed as a unified body with the inner molded portions 331 formed therein. A reason for performing the dwelling process in the inner molding process at a low temperature and a low pressure is to prevent the stator coils 309 and 311 wound on the bobbins 310 and 312 from being damaged by breaking or the like.

Figure 8:
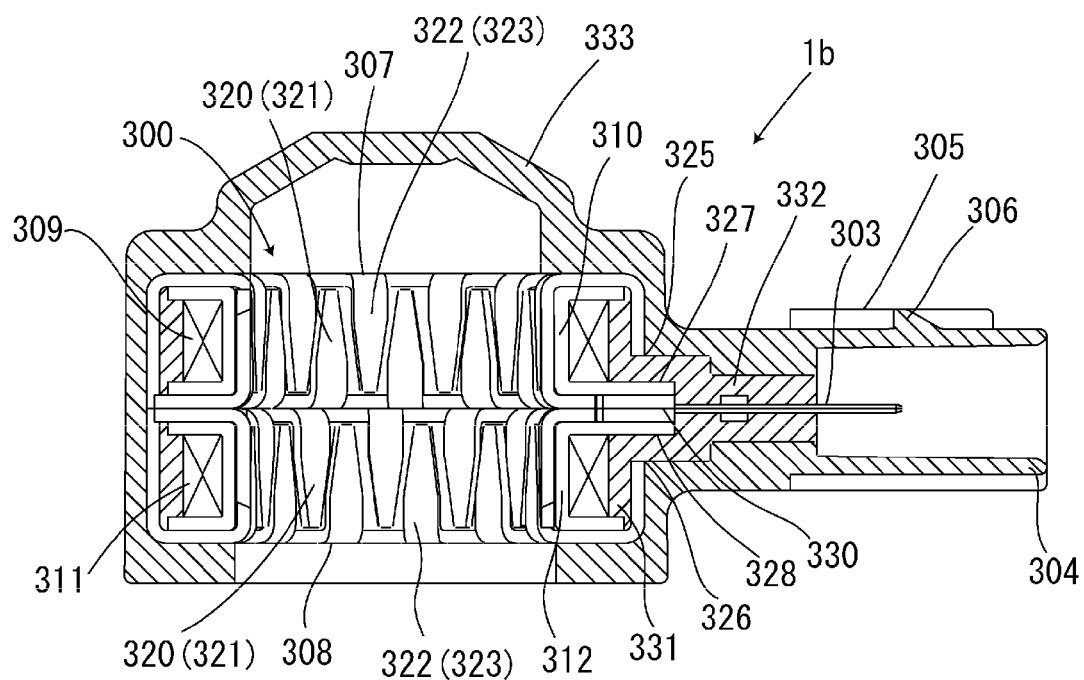
FIG. 8 is a cross-sectional view illustrating the configuration of the electromagnetic drive coil unit according to the second embodiment of the invention after outer molding.
Figure 9:
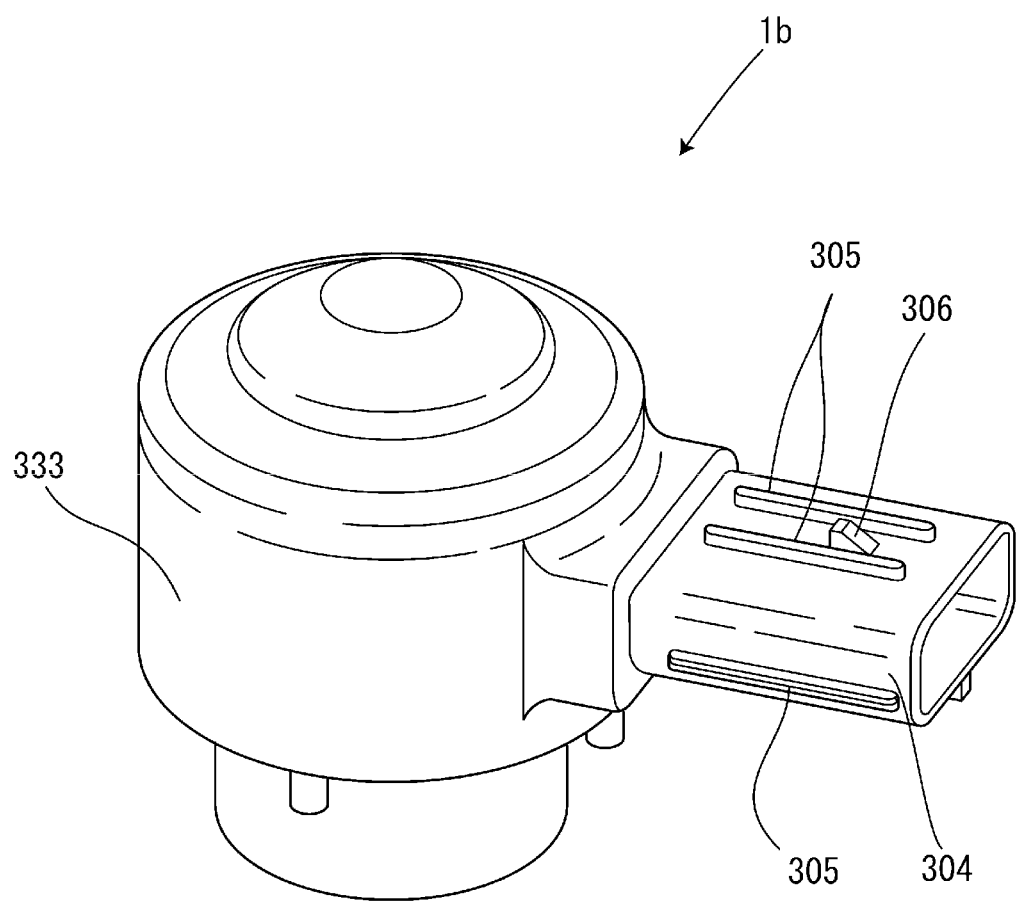
FIG. 9 is a perspective view illustrating the electromagnetic drive coil unit according to the second embodiment of the invention after the outer molding.

Then, as illustrated in FIG. 8, an outer molding process is performed using a dwelling process at a high temperature and a high pressure using a resin material which is the same type of resin material as the resin material used to perform the inner molding process. Accordingly, the outer circumference of the stator assembly 300 having the inner molded portions 331 and the outer circumference of the inner molded portions 332 which seal the outer circumference of the power supply terminal 303 are sealed with outer molded portions 333. At the same time, as illustrated in FIGS. 8 and 9, portions (inner molded portions 332) located on the tip side of the power supply terminal 303 are formed as a connector portion 304 to which a plug can be connected by the outer molded portions 333.

The reason for performing the dwelling process in the outer molding process at a high temperature and a high pressure is to prevent a void from being formed in the resin material. As a result, it is possible to secure satisfactory strength of the outer molded portions 333 or portions covered therewith and to improve the dimension accuracy of the connector portion 304. The resin material used to perform the inner molding process and the resin material used to perform the outer molding process may be different from each other, but are preferably the same in consideration of unity of a product as a whole or bondability between the resins.

As described above, in the method of molding the electromagnetic drive coil unit 1b according to the second embodiment of the invention, since the outer circumferences of the electromagnetic drive coil unit 1b or the like are sealed through the outer molding process using the dwelling process at a high pressure, it is possible to prevent a liquid such as water from invading into the electromagnetic drive coil unit 1b using the molded portion and to prevent a void from being formed in the molded portion. Accordingly, it is possible to provide an electromagnetic drive coil unit 1b with waterproof properties and strength secured.

Since the inner molding process in which the resin material is introduced into the upper and lower yokes 307 and 308 is performed through the dwelling process at a low pressure, it is possible to prevent breaking of the stator coils 309 and 311, which are disposed in the stator assembly 300 and which can be relatively easily broken with an external pressure.

On the other hand, since the inner molded portions 331 formed in the inner molding process is formed in the dwelling process at a low pressure in consideration of an influence of breaking of the stator coils 309 and 311 or the like, it may be difficult to secure satisfactory strength due to formation of a void or the like. However, since the inner molded portions 332, which are formed in the inner molding process, of the outer circumference of the stator assembly 300 having the inner molded portions 331 and the outer circumference of the power supply terminal 303 molded in a resin material supplied in the inner molding process are covered with the outer molded portions 333, a double-molded structure is provided in which the inner molded portions 331 and 332 are covered with the outer molded portions 333, and it is particularly possible to satisfactorily enhance the strength of the portions molded in the dwelling process at a low pressure.

Since the connector portion 304 is formed as a part of the outer molded portions 333 and is molded in the dwelling process at a high temperature and a high pressure which can satisfactorily enhance the filling density of the resin material, it is possible to prevent unevenness in quality of the connector portion 304, thereby enhancing a degree of adhesion between a plug and the connector portion and enhancing waterproof properties.

While the first and second embodiments have been described, the invention is not limited to the embodiments and can be modified in various forms without departing from the gist of the invention. For example, as a modification of the second embodiment, although the size increases, the inner molded portions 331 may be formed up to the outside of the upper and lower yokes 307 and 308, or the upper and lower yokes 307 and 308 may be attached to the stator assembly 300 after the inner molding process is performed in consideration of the moldability, the configuration of the die of the injection molding machine, or the like.

The inner molding process may be performed in a state in which two outer yokes 323, that is, the upper and lower outer yokes, are detached from the stator assembly 300 illustrated in FIG. 6, the two outer yokes 323 may then be attached thereto, and the outer molding process may be performed in this state. In this case, even when the two outer yokes 323 are detached from the stator assembly 300, the stator assembly can be provided.

In the method of molding the electromagnetic drive coil unit 1b according to the second embodiment, the resin material is introduced into the yokes 307 and 308 through plural introduction holes 324 when performing the inner molding process, and the resin material is introduced from the single resin injection hole 240 instead of the plural holes as illustrated in FIG. 4 when performing the outer molding process. The reason therefor is that when performing the inner molding process, the inside of the stator assembly 300 has a complicated structure and the resin material has only to be introduced at a low pressure so as to prevent damage of the stator coils 309 and 311 at the time of introduction of the resin material. Accordingly, the resin material in the inner molding process is introduced from plural introduction holes 324, but may be introduced from a single introduction hole.

When performing the outer molding process, the number of resin injection holes 240 may be two or more. However, when the resin material is introduced from plural resin injection holes 240, a so-called weld line may be formed in a merging portion of the resin materials flowing from the injection holes, the strength in the portion may decrease to form cracks in the weld line due to a variation in temperature, and thus moisture may invade. Therefore, in order to prevent formation of a weld line, it is preferable that the resin injection hole 240 be formed at one position (for example, one position of the ceiling portion of the electromagnetic drive coil unit 1b). When the formation of a weld line is permitted, the resin injection hole may be formed at plural positions.

What is claimed is:

1. A resin molded electromagnetic drive coil unit comprising:
   a stator assembly including a cylindrical yoke having magnetic pole teeth formed therein, a stator coil, and a power supply terminal to the stator coil, and
   a connector frame member surrounding the power supply terminal to the stator coil,
   wherein the stator assembly and the connector frame member which are molded through separate processes are formed as a unified body, and
   wherein said connector frame member is molded in advance, said connector frame member is inserted onto the stator assembly, and the resultant is molded as a unified body.

2. The resin molded electromagnetic drive coil unit according to claim 1, wherein an outer circumference of the stator assembly is molded in a resin in a state in which the connector frame member is connected to the stator assembly.

3. The resin molded electromagnetic drive coil unit according to claim 1, wherein said connector frame member includes a connector portion to which a plug is adapted to be inserted, and a coupling portion which is in contact with an outer circumference of the yoke of the stator assembly, and outer circumferences of the stator assembly and the coupling portion are molded in a resin.

4. The resin molded electromagnetic drive coil unit according to claim 3, wherein the coupling portion of the connector frame member is provided with ribs for enhancing bondability to the molding resin.

5. The resin molded electromagnetic drive coil unit according to claim 1, wherein introduction holes are formed in side walls of the yoke of the stator assembly for introducing the resin therein.

6. The resin molded electromagnetic drive coil unit, wherein the stator assembly which is molded in advance is used as an inner molded body and a connector frame member is formed as a unified body with the inner molded body through an outer molding process,
   herein the stator assembly including a cylindrical yoke having magnetic pole teeth formed therein, a stator coil, and a power supply terminal to the stator coil, and
   and the connector frame member surrounding the power supply terminal to the stator coil,
   wherein the stator assembly and the connector frame member which are molded through separate processes are formed as a unified body, and
   wherein said connector frame member is molded in advance, said connector frame member is inserted into the stator assembly, and the resultant is molded as a unified body.

7. The resin molded electromagnetic drive coil unit according to claim 6, wherein the outer molding process is a resin molding process.

8. A resin molded electromagnetic drive coil unit having a double molded structure comprising:
   a stator assembly including a cylindrical yoke having magnetic pole teeth formed therein, a stator coil, and a power supply terminal to the stator coil, and
   a connector frame member surrounding the power supply terminal to the stator coil,
   wherein the stator assembly and the connector frame member which are molded through separate lower pressure processes are formed as a unified body, and
   wherein said connector frame member is molded in advance, said connector frame member is inserted onto the stator assembly, and the resultant is molded as a unified outer body at a higher pressure than the stator assembly and has added strength to form the double molded structure.

9. The resin molded electromagnetic drive cell unit having a double molded structure of claim 8, wherein the stator assembly is an inner molded structure and the unified outer body has fewer void space than the inner molded stator assembly.

* * * * *